(12) United States Patent
Wenzel et al.

(10) Patent No.: US 9,703,029 B2
(45) Date of Patent: Jul. 11, 2017

(54) METHOD FOR PROVIDING ILLUMINATED COMPONENTS AND COMPONENTS FORMED FROM THE METHOD

(71) Applicants: Edward J. Wenzel, Troy, MI (US); Joseph A. Massetti, Algonac, MI (US); David W. Whitehead, Rochester Hills, MI (US); Aidano C. Nascimento, Rochester, MI (US)

(72) Inventors: Edward J. Wenzel, Troy, MI (US); Joseph A. Massetti, Algonac, MI (US); David W. Whitehead, Rochester Hills, MI (US); Aidano C. Nascimento, Rochester, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 13/630,383

(22) Filed: Sep. 28, 2012

(65) Prior Publication Data

US 2013/0077338 A1    Mar. 28, 2013

Related U.S. Application Data

(60) Provisional application No. 61/540,275, filed on Sep. 28, 2011, provisional application No. 61/623,889, filed on Apr. 13, 2012.

(51) Int. Cl.
*F21V 8/00* (2006.01)
*B60Q 3/64* (2017.01)
(Continued)

(52) U.S. Cl.
CPC ............. *G02B 6/0005* (2013.01); *B60Q 3/54* (2017.02); *B60Q 3/64* (2017.02); *B60Q 3/78* (2017.02);
(Continued)

(58) Field of Classification Search
CPC .. B60Q 3/004; B60Q 3/0289; B60Q 2500/10; B60Q 3/54; B60Q 3/78; B60Q 3/64;
(Continued)

(56) References Cited

U.S. PATENT DOCUMENTS 1,647,014 A    10/1927  Pattison
2,214,447 A    9/1940   Bave
(Continued)

FOREIGN PATENT DOCUMENTS

CA    20122840245    1/2013
RU    2248023 C2     3/2005
(Continued)

OTHER PUBLICATIONS

Written Opinion for International Application No. PCT/US2012/057901; Date of Mailing Jan. 31, 2013.
(Continued)

*Primary Examiner* — David V Bruce
(74) *Attorney, Agent, or Firm* — Cantor Colburn LLP

(57) ABSTRACT

A method of illuminating a component, having an outer skin layer, the method including the steps of: forming a seam of the outer skin layer; and locating an elongated light conducting medium in the seam.

20 Claims, 13 Drawing Sheets

(51) Int. Cl.
*B60Q 3/78* (2017.01)
*B60Q 3/54* (2017.01)
*G01D 11/28* (2006.01)

(52) U.S. Cl.
CPC .......... *G02B 6/001* (2013.01); *B60Q 2500/10* (2013.01); *G01D 11/28* (2013.01); *G02B 6/0065* (2013.01)

(58) Field of Classification Search
CPC .... G02B 6/001; G02B 6/0065; G02B 6/0005; G01D 11/28
USPC ................................ 362/551, 488, 489, 103
See application file for complete search history.

(56) References Cited

U.S. PATENT DOCUMENTS

| | | | |
|---|---|---|---|
| 2,561,756 | A | 7/1951 | Shook |
| 3,641,332 | A | 2/1972 | Reick et al. |
| 3,641,333 | A | 2/1972 | Gendron |
| 4,234,907 | A | 11/1980 | Daniel |
| 4,422,719 | A | 12/1983 | Orcutt |
| 4,523,258 | A | 6/1985 | Morse et al. |
| 4,652,981 | A | 3/1987 | Glynn |
| 4,724,327 | A | 2/1988 | Mitchell |
| 4,727,603 | A | 3/1988 | Howard |
| 4,839,777 | A | 6/1989 | Janko et al. |
| 4,947,293 | A | 8/1990 | Johnson et al. |
| 5,067,831 | A | 11/1991 | Robbins et al. |
| 5,070,436 | A | 12/1991 | Alexander et al. |
| 5,113,325 | A | 5/1992 | Eisenbraun |
| 5,134,281 | A | 7/1992 | Bryenton et al. |
| 5,206,562 | A | 4/1993 | Matsuno et al. |
| 5,366,780 | A | 11/1994 | Rapisarda |
| 5,375,044 | A | 12/1994 | Guritz |
| 5,430,621 | A | 7/1995 | Raskas |
| 5,477,424 | A | 12/1995 | Mocha |
| 5,502,903 | A | 4/1996 | Barker |
| 5,560,677 | A | 10/1996 | Cykana et al. |
| 5,611,089 | A | 3/1997 | Cretors |
| 5,647,658 | A | 7/1997 | Ziadi |
| 5,649,755 | A | 7/1997 | Rapisarda |
| 5,680,496 | A | 10/1997 | Burkitt, III et al. |
| 5,709,448 | A | 1/1998 | Jennings et al. |
| 5,813,148 | A | 9/1998 | Guerra |
| 5,857,273 | A | 1/1999 | Rapisarda |
| 5,879,076 | A | 3/1999 | Cross |
| 6,059,414 | A | 5/2000 | Tsai |
| 6,116,175 | A * | 9/2000 | Ito ........................... 112/475.06 |
| 6,126,233 | A | 10/2000 | Gaetano et al. |
| 6,146,006 | A | 11/2000 | Cross |
| 6,238,075 | B1 | 5/2001 | Dealey, Jr. et al. |
| 6,352,355 | B1 | 3/2002 | Law |
| D458,732 | S | 6/2002 | Chain |
| 6,450,678 | B1 * | 9/2002 | Bayersdorfer ................ 362/581 |
| 6,536,928 | B1 | 3/2003 | Hein et al. |
| 6,561,684 | B2 | 5/2003 | Reitze et al. |
| 6,655,824 | B2 | 12/2003 | Tufte |
| 6,736,442 | B2 | 5/2004 | Gebreselassie et al. |
| 6,773,129 | B2 | 8/2004 | Anderson, Jr. et al. |
| 6,854,869 | B1 | 2/2005 | Fernandez |
| 7,020,369 | B2 | 3/2006 | Lodge, Jr. et al. |
| 7,134,773 | B2 | 11/2006 | Tufte |
| 7,221,264 | B2 | 5/2007 | Woo et al. |
| 7,397,993 | B1 | 7/2008 | Nave et al. |
| 7,431,484 | B2 * | 10/2008 | Fong ........................... 362/489 |
| 7,690,318 | B2 * | 4/2010 | Dooley et al. ........... 112/475.17 |
| 7,735,152 | B2 | 6/2010 | Golle |
| 7,753,542 | B2 | 7/2010 | Bruce et al. |
| 7,766,501 | B2 | 8/2010 | Rapisarda |
| 7,987,030 | B2 | 7/2011 | Flores et al. |
| 8,215,810 | B2 | 7/2012 | Welch, Sr. et al. |
| 8,256,945 | B2 | 9/2012 | Choquet |
| 8,376,564 | B2 | 2/2013 | Finn |
| 8,376,596 | B2 | 2/2013 | Beau et al. |
| 8,482,430 | B2 | 7/2013 | Szczerba |
| 8,536,075 | B2 | 9/2013 | Leonard |
| 2008/0219017 | A1 | 9/2008 | Cruickshank |
| 2009/0316401 | A1 * | 12/2009 | Choquet ...................... 362/235 |
| 2010/0195337 | A1 | 8/2010 | Heite et al. |
| 2010/0296302 | A1 * | 11/2010 | Welch et al. ................ 362/471 |
| 2011/0000061 | A1 * | 1/2011 | Dooley et al. ................ 29/91.1 |
| 2011/0032715 | A1 | 2/2011 | Beau et al. |
| 2011/0063872 | A1 * | 3/2011 | Irie .............................. 362/565 |
| 2011/0084852 | A1 * | 4/2011 | Szczerba ...................... 340/905 |
| 2011/0164406 | A1 | 7/2011 | Chen |
| 2013/0026504 | A1 | 1/2013 | Marx et al. |
| 2013/0027955 | A1 | 1/2013 | Grote, III et al. |
| 2013/0027976 | A1 | 1/2013 | Robbins et al. |
| 2013/0077338 | A1 | 3/2013 | Wenzel et al. |

FOREIGN PATENT DOCUMENTS

| | | |
|---|---|---|
| RU | 2287737 C2 | 11/2006 |
| RU | 87027 U1 | 9/2009 |
| WO | 9002906 A1 | 3/1990 |
| WO | 9718105 | 5/1997 |
| WO | 0119643 A1 | 3/2001 |
| WO | 2004078518 A1 | 9/2004 |
| WO | 2013090371 A1 | 6/2013 |

OTHER PUBLICATIONS

International Search Report for International Application No. PCT/US2012/057901; Date of Mailing Jan. 31, 2013.
English Abstract 87027.
English Abstract 2248023.
English Abstract 2287737.
Extended European Search Report for Application No. 12834791.1 dated May 18, 2015.

* cited by examiner

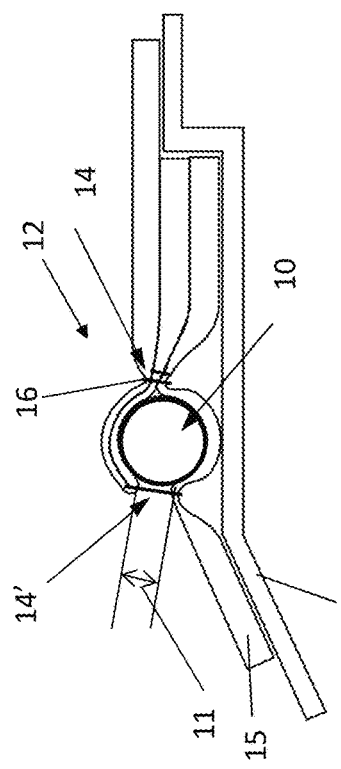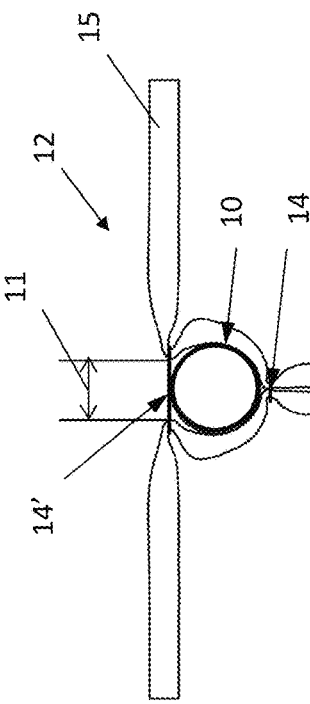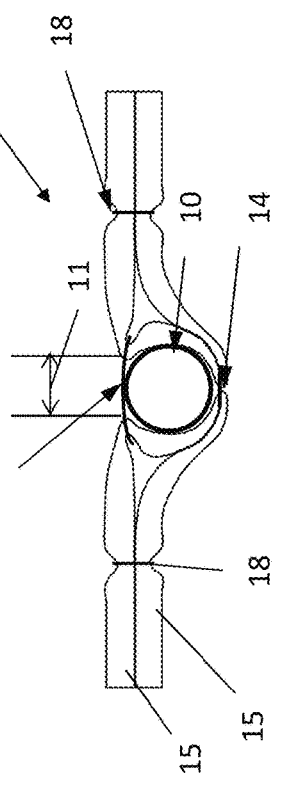

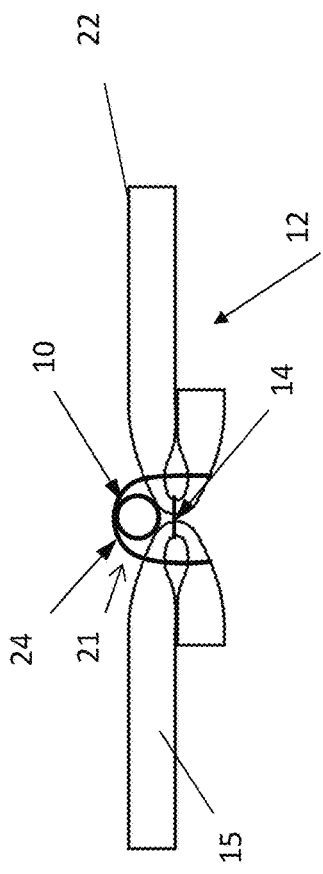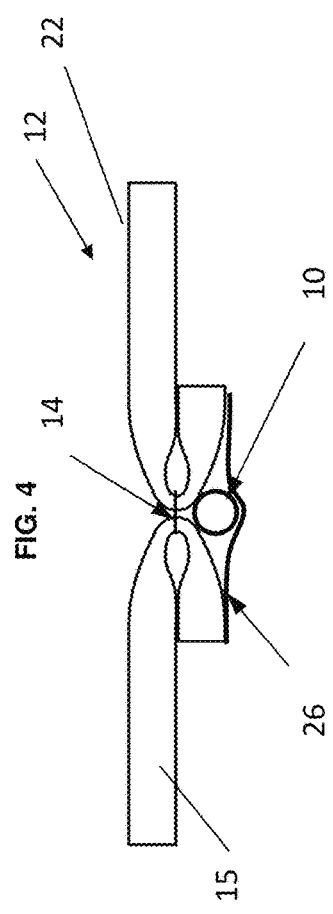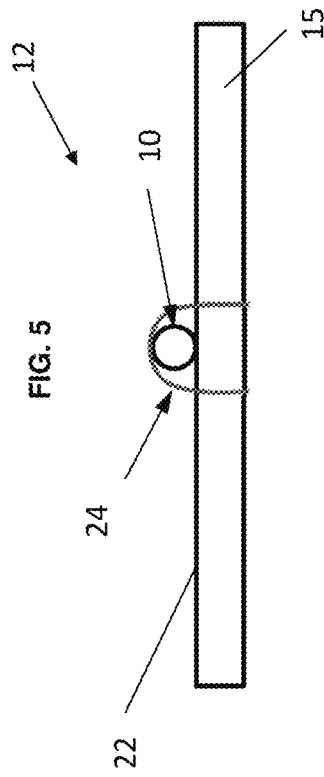

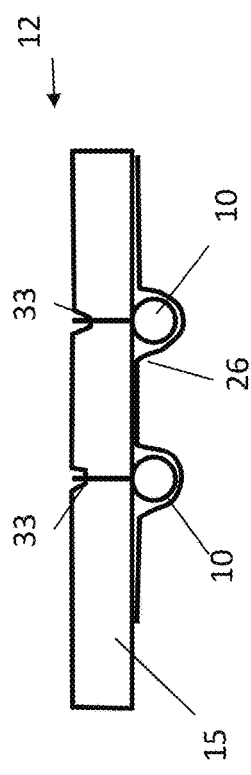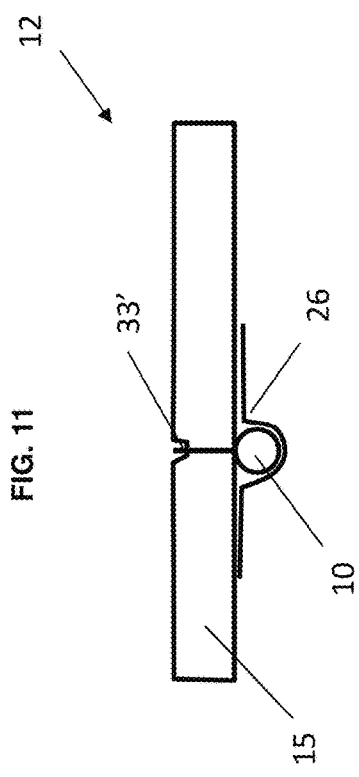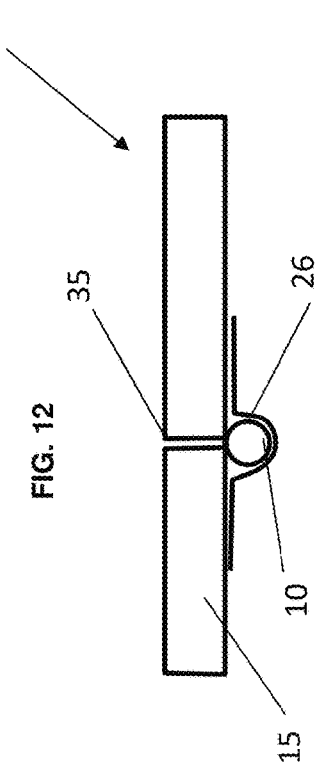

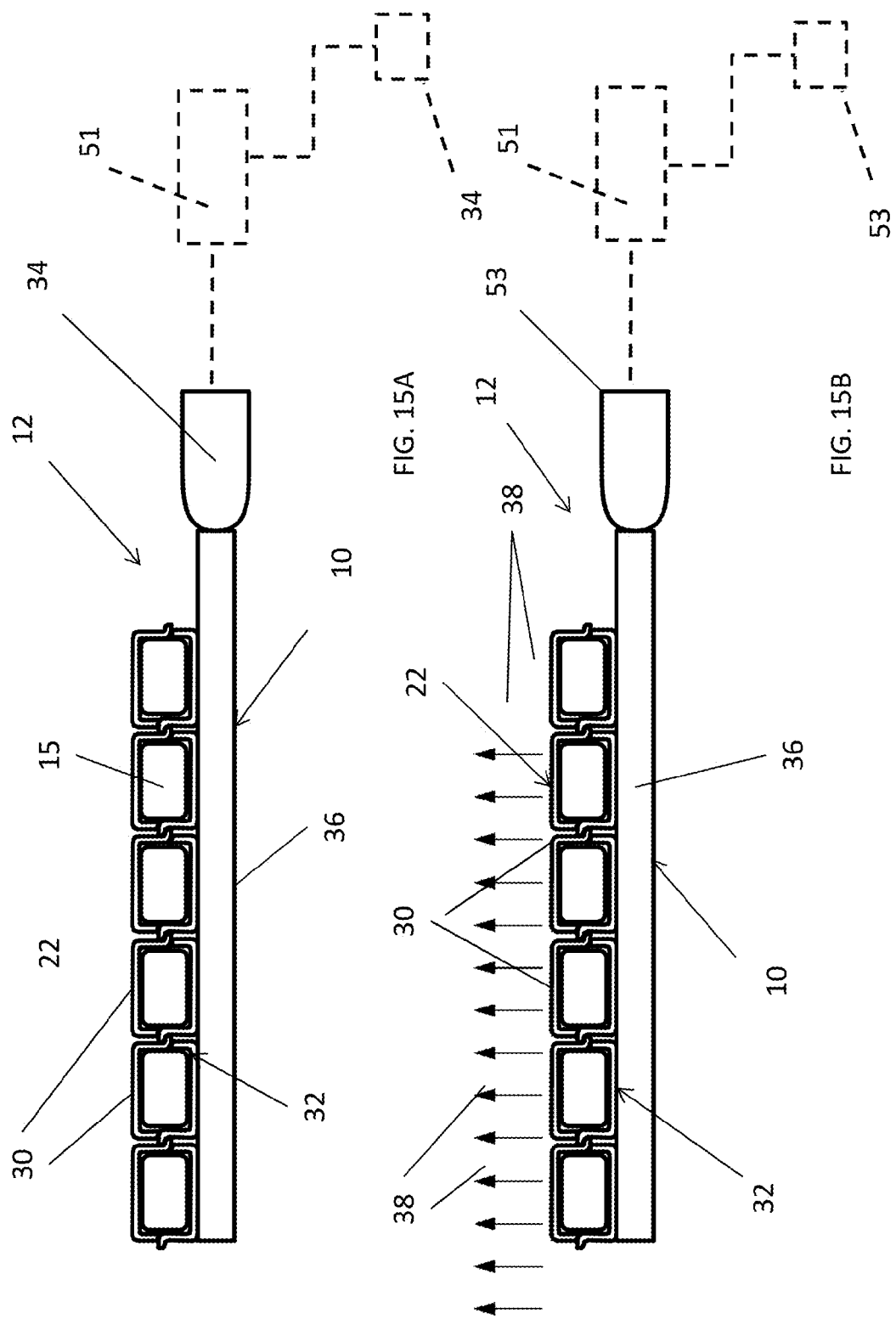

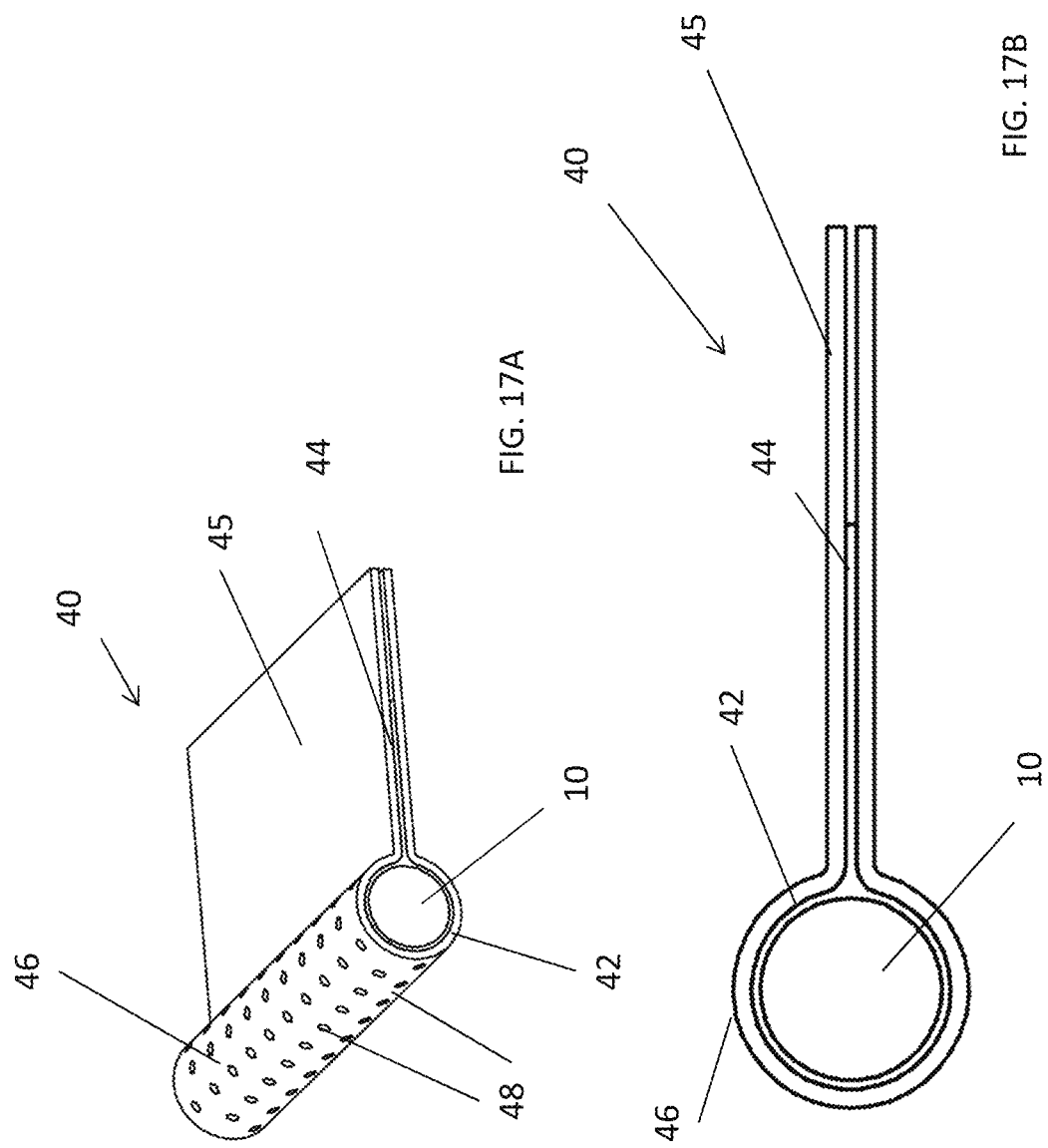

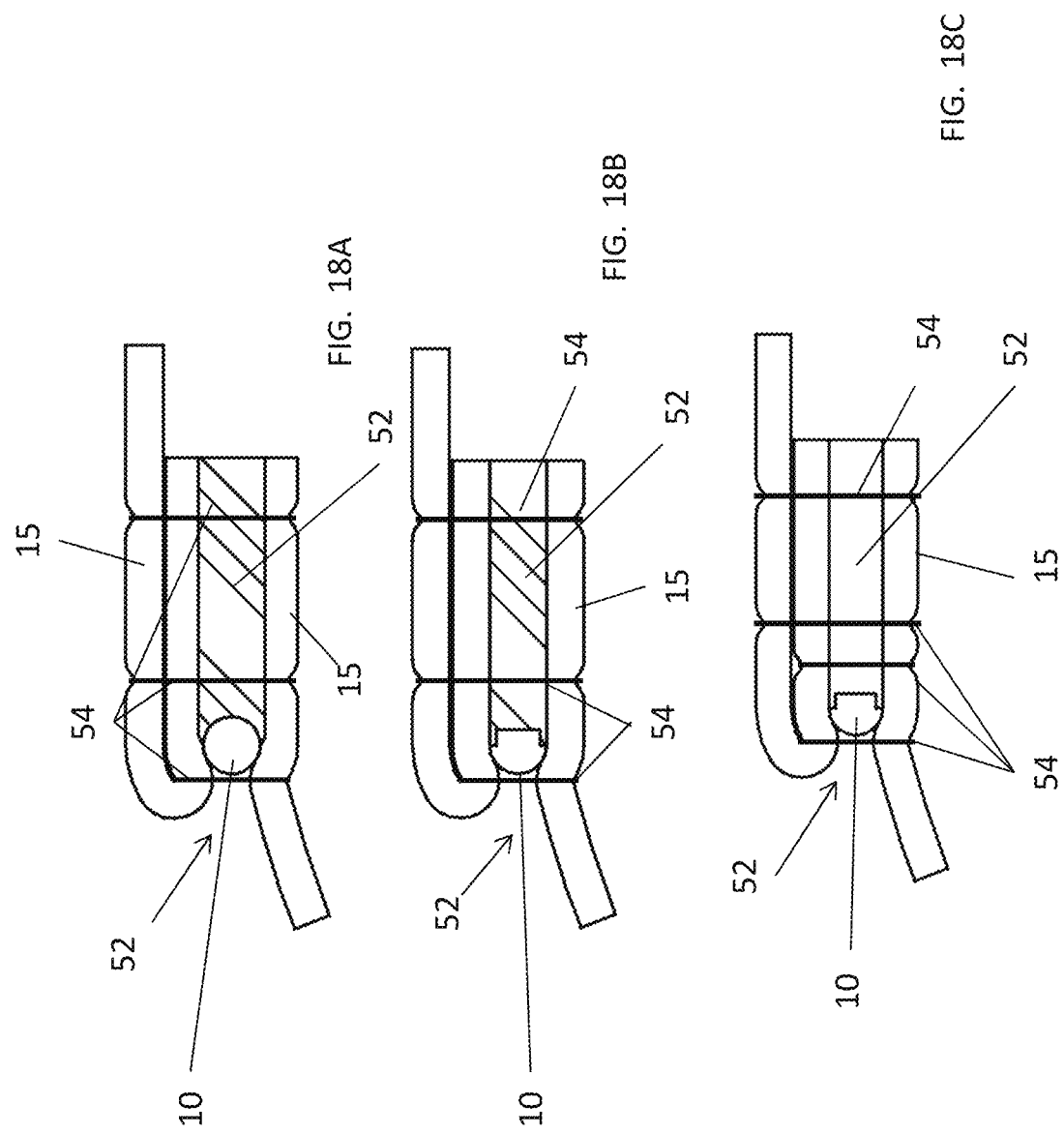

METHOD FOR PROVIDING ILLUMINATED COMPONENTS AND COMPONENTS FORMED FROM THE METHOD

CROSS REFERENCE TO RELATED APPLICATIONS

This application claims the benefit of U.S. Provisional Patent Applications 61/540,275 filed Sep. 28, 2011 and 61/623,889 filed Apr. 13, 2012, the contents each of which are incorporated herein by reference thereto.

BACKGROUND

This invention relates to an illuminated structure and more particularly, the invention relates to a method for providing illuminated stitching wherein the stitching provides an illuminated component.

Currently, most stitching found in an article of manufacture is of the functional variety, wherein 2 or more pieces of material (e.g., leather, vinyl, thermoplastic polyolefin (TPO), cloth, polyurethane skin, or other man made or natural skin items, etc.) are cut from a pattern and sewn together (cut-n-sew) prior to being wrapped around a component such as a seat cushion, head rest, arm rest, console lid, instrument panel, door trim, console, substrate, etc.

A simulated functional or non-functional stitch has been used in some applications; however, the ability to offer a simulated stitch with a changing color or illumination is not production feasible at this time. Additionally, more manufactures are requesting a real or "live" stitch be used on decorative components to provide the look and feel of a true cut-n-sew component at reduced cost. Still further, the ability to change the appearance of functional stitching is also desirable.

Accordingly, it is desirable to provide an illuminated stitch (functional or non-functional) on a stitched component.

SUMMARY OF THE INVENTION

A method of illuminating a component, having an outer skin layer, the method including the steps of: forming a seam of the outer skin layer; and locating an elongated light conducting medium in the seam.

Alternatively, the component can also consist of a hard panel only wherein the light conducting medium is attached to the backside of the component via tape or decorative stitching that penetrates the hard panel. A continuous or discontinuous channel, molded-in or secondarily trimmed into the panel serves as a means of transmitting the light from the back to front side of the panel.

A trim component having a seam wherein an elongated light conducting or light generating medium is located in the seam.

BRIEF DESCRIPTION OF THE DRAWINGS

Other features, advantages and details appear, by way of example only, in the following description of embodiments, the description referring to the drawings in which:

FIGS. 1-13 are various cross-sectional views of a portion of a component formed in accordance with various exemplary embodiments of the present invention;

FIGS. 15A and 15B are cross-sectional views of an article illuminated a light source and translucent threads;

FIGS. 17A and 17B are views illustrating a source of illumination wrapped with a perforated material;

FIGS. 18A-18C are views illustrating alternative configurations of the source of illumination coextruded with a material;

DETAILED DESCRIPTION

Figure 7:
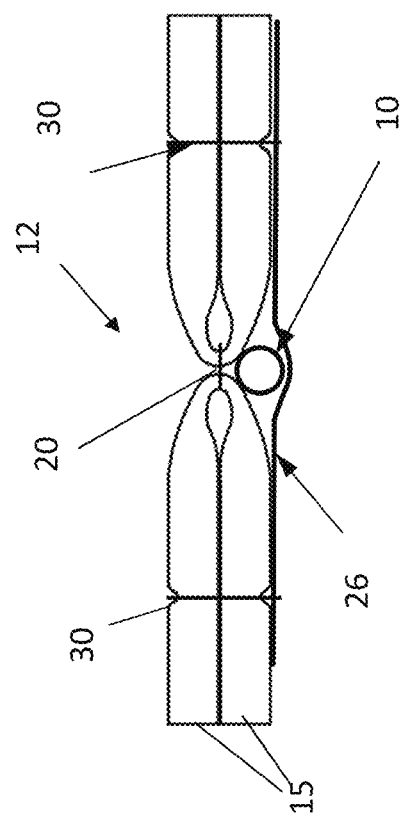

Various embodiments of the present invention are directed to alternative means of adding accent lighting to an article of manufacture and in one non-limiting embodiment, an automotive vehicle interior by integrating lighting as part of the sewing operation. Various embodiments of the invention are also applicable to any and all industries which manufacture a product containing a decorative and/or functional stitch.

One embodiment described herein proposes the use of the sewing process to incorporate accent lighting to a vehicle interior. In accordance, with exemplary embodiments of the present invention accent lighting can be sewn into a component using, but not limited to, one of the following methods:

1) Use of a light pipe, fiber optic cable, or other light conducting medium and/or generating medium as a thread that is sewn into a trim component that produces an illuminated stitch when connected to a light source.

When the lighting source is used as a thread as mentioned above, the light conducting medium should be of a diameter and construction to be passed through a needle within a chain stitch or lock stitch type sewing machine. Chain stitch type sewing is the preferred method, as the thread is subjected to much less abrasion and torsion during stitching. Of course, other stitch types can be used and are contemplated to be within the scope of various embodiments of the present invention.

2) Light pipe, fiber optic cable, or other light conducting medium or light generating medium that is sewn into the seam which either joins two materials together or produces a visual effect that simulates the joining of two materials. When connected to a light source, the light conducting medium emits light to illuminate the join seam produced by the sewing operation.

When encapsulated within the join seam as described in second embodiment above, the light conducting medium can be of any number of diameters and constructions to provide the degree of light intensity and visual effect required by the manufacturer. For example, when encapsulated as part of deck seam design, the following assembly steps can be followed:

Step a) Use single or double needle machine to join two pieces of material together. Thread tension on inside seam should be reduced to allow joined materials to separate slightly when placed under tension.

Step b) Fold top layer of material back upon itself and stitch to join seam, outside of initial join seam stitch, produced a deck type fold in the materials.

Step c) Insert light conducting medium between the two materials at the join seam.

As mentioned above and will be discussed herein, the light conduction medium can be incorporated into the seam during or after sewing and in one embodiment, the medium is integrated during the sewing process to avoid damaging the medium during post-seam sewing installation. Accordingly, one exemplary embodiment is directed to incorporating the side emitting fiber optic cable during the sewing process as opposed to inserting it after the seams have been made.

In the methods described above and herein, light intensity and color can be varied by the end consumer based on individual taste. Illumination timing and frequency can also be tied, but not limited, to vehicle function(s), such as turn signal indicators, music volume, vehicle speed, engine RPM and/or acceleration. Accordingly and in various alternative embodiments, the illumination of the light conducting medium and/or generator can be coupled to a controller or microcontroller 51 (see the dashed lines of FIGS. 15A, 15B, 21A and 21B) of the aforementioned vehicle functions (illustrated schematically by box 53) such that the illumination of the medium is varied accordingly. Still further, the controller or microcontroller 51 may be used to vary the illumination in non-vehicular applications wherein other functions (e.g., music volume, beat, detected light, etc. or any other application wherein variation of the illumination is desired) are used to vary the illumination.

Turning now to the drawings, wherein to the extent possible like reference numerals are utilized to designate like components throughout the various views and various embodiments of the present invention. As shown throughout the FIGS., it is seen that an interior portion 12 of a vehicle or any other manufacturable component is illustrated. In one implementation interior portion 12 is a portion of an instrument panel of a vehicle. Of course, other configurations and components are also contemplated and thus various embodiments disclosed herein need not be limited to vehicular applications as they are but one of many applications.

As best illustrated in FIG. 1, the interior portion 12 comprises an outer skin layer 15 or layers secured to each other and each having a substantially smooth outer surface and an underside facing away from the outer surface. The outer skin layer 15 can be any one of leather, vinyl, thermoplastic polyolefin (TPO), cloth, combinations thereof etc.) that are cut from a pattern and sewn together (cut-n-sew) prior to being wrapped around a component such as a seat cushion, head rest, arm rest, console lid, instrument panel substrate, etc. or any other component wherein illuminated stitches or seams are desired.

In one embodiment and in order to enhance the softness of portion 12, a layer of cushioning support material can be provided in the region below the outer skin layer 15. It is contemplated that the cushioning support material may be of any number of different constructions although a foamed material such as cross linked polypropylene (XLPP) foam may be potentially preferred. Also a substrate panel 17 of dimensionally stable plastic or other suitable material is preferably disposed below the cushioning support material.

In one embodiment, the cushioning support material and the substrate panel serve cooperatively to provide a support structure for the outer skin layer 15.

It one embodiment, a polyurethane foam (PUR) forms the cushioning support material and may be blown between the outer skin layer 15 and the substrate panel 17 so as to form a multi-layered composite structure. It is also contemplated that the cushioning material may be attached to the outer skin layer 18 in a preliminary cladding operation so as to form a preliminary layered composite which may thereafter be applied across any substrate panel 17 as may be utilized.

Of course and in other embodiments, the outer skin layer 15 can be anyone of a single layer of material such as leather, vinyl, TPO, cloth, combinations thereof etc.) that are cut from a pattern and sewn together (cut-n-sew) prior to being wrapped around a component such as a seat cushion, head rest, arm rest, console lid, instrument panel substrate, etc. or any other component wherein illuminated stitches or seams are desired. FIGS. 1-3 illustrate some non-limiting possible methods of encapsulating a light conducting medium and/or generator 10 in a trim piece 12 between two parallel join seams 14 of outer skin layer 15. In one embodiment, the light conducting and/or generating medium 10 is a side emitting fiber optic cable or any other suitable elongated light conducting device capable of being used as the light conducting and/or generating medium 10 or a stitch in accordance with various embodiments of the present invention. For example, the side emitting fiber optic cable can be anyone of poly(methyl methacrylate) (PMMA) (e.g., transparent thermoplastic) material, jacketed glass fibers, polytetrafluoroethylene (PTFE), and equivalents thereof etc.

In one non-limiting embodiment the light conducting and/or generating medium 10 is replaced by an electroluminescent wire (E-wire). In this embodiment, the electroluminescent wire may in some instances create radio frequency (RF) interference and is thus applicable to components wherein RF interference would not be an issue or wherein the RF interference from the electroluminescent wire is of a non-interfering frequency.

FIGS. 1-3 illustrate various embodiments, with a light conducting medium is retained between two join seams (14, 14'). In particular, FIG. 1 illustrates, a deck seam with two join seams 14 and 14' enveloping a side emitting fiber optic cable 10. Here tension control on the join seam 14' (e.g., tension controlled join seam) controls the design gap 11. Accordingly, light from the side emitting fiber optic cable 10 shows through the design gap 11. In one embodiment, the threads for the seams can be clear multi-strand or monofilament or can be pigmented depending on the desired effect. In FIG. 1, a 3rd (decorative) stitch 16 is provided to create a deck seam fold.

FIG. 2 illustrates an illuminated join seam 14 with join seam cross stitching serving to separate the light as desired. Here a deck seam with two join seams enveloping a side emitting fiber optic cable 10 is illustrated. Once again, tension control on the join seams controls the design gap 11 and light from the side emitting fiber optic cable 10 shows through the design gap 11. As previously mentioned, the threads can be clear multi-strand or monofilament or can be pigmented depending on the desired effect.

FIG. 3 is similar to FIG. 2 with the addition of a double needle (French) seam 18 stitch to secure the selvage to the backside of the material. Once again, tension control on the join seams controls the design gap 11 and light from the side emitting fiber optic cable shows through the design gap. As mentioned above, the threads can be clear multi-strand or monofilament or can be pigmented depending on the desired effect.

FIGS. 4-6 illustrate still other possible methods of securing a light conducting and/or generating medium 10 to the show surface 22 of a join seam 20 or material surface 22. Here the light conducting medium is retained by a functional stitch 24 or a tape 26. Alternatively, both a functional stitch 24 and a tape 26 may be used. A cross stitch 24 is used to secure the light conducting medium to the top of the join seam in FIG. 4 while a tape 26 is used to secure the light conduction medium to the backside as shown in FIG. 5. In FIG. 6 a cross-stitch 24 is used to secure a light conducting medium to the surface of the material at non-join areas. In FIG. 4, a join seam with a decorative/functional hold down stitch 24 retains the side emitting fiber optic cable 10 in a trench 21 of the join seam.

FIG. 4 illustrates a join seam with a retainer tape 26 that holds the side emitting fiber optic cable 10 in the trench 21 of the join seam. As in any of the previous embodiments, the threads can be clear multi-strand or monofilament or can be pigmented depending on the desired effect. In FIG. 6 a decorative/functional hold down stitch 24 retains the side emitting fiber optic 10 on the surface 23 of the material 15. As in any of the previous embodiments, the threads used for the stitch or stitches can be clear multi-strand or monofilament or can be pigmented depending on the desired effect.

Figure 8:
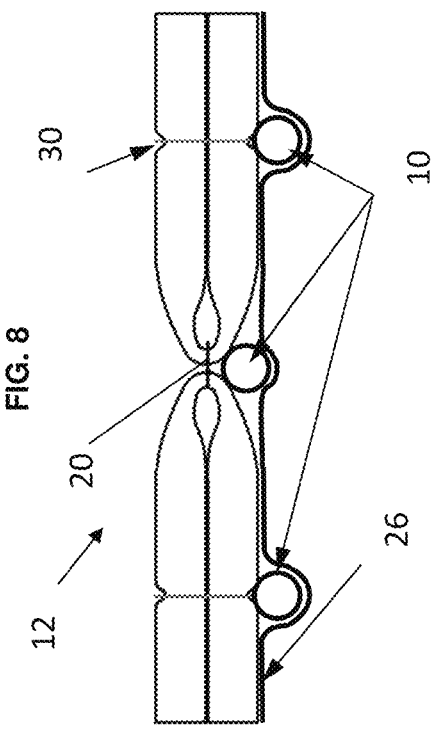
Figure 9:
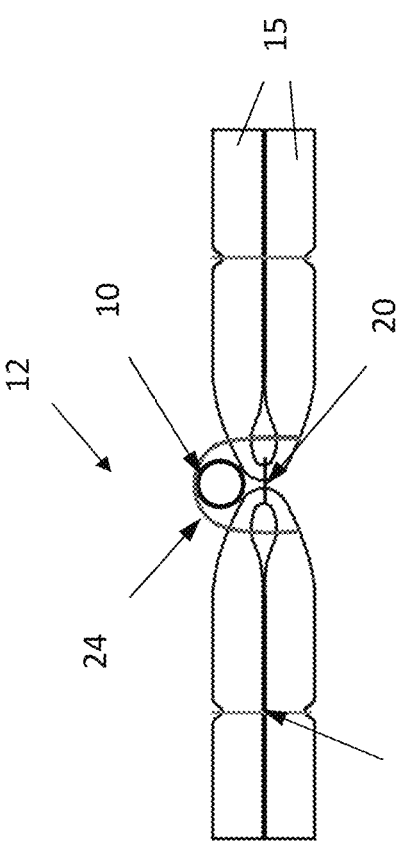
Figure 10:
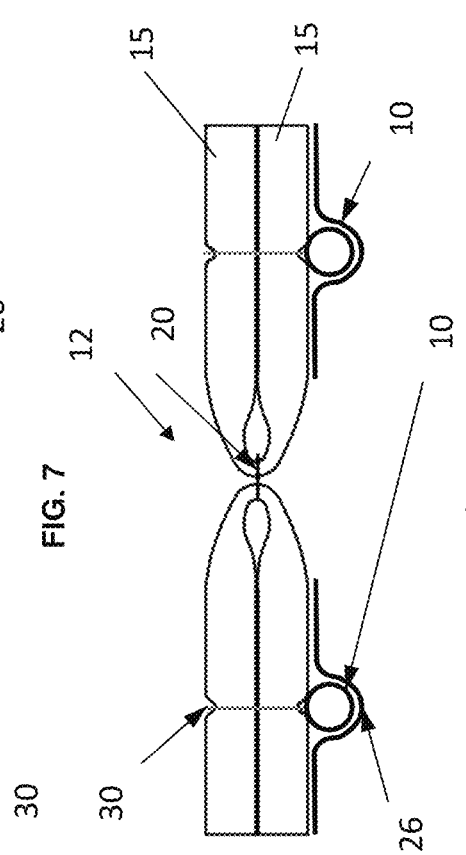

FIGS. 7-10 illustrate still other additional methods of securing a light conducting and/or generating medium 10 to the surface of a join seam or material surface using a functional stitch 24 or a tape or retainer tape 26. Still further both a functional stitch 24 and tape 26 may be employed. FIGS. 7 and 8 are comparable to FIGS. 4 and 5, with the addition of a double needle stitch (French seam) 30 which also secures the selvage to the backside of the material. FIGS. 9 and 10 utilize a light conducting and/or generating medium 10 behind the double needle stitching with or without join seam 20 illumination as an option. Also illustrated is that multiple or numerous light conducting and/or generating mediums 10 are employed in various locations proximate to the seams and/or the related threads.

In the attached FIGS. some but not all multiple combinations of side emitting fiber optic cable 10 are illustrated. Accordingly, numerous configurations are possible and are not limited to the specific examples described herein. As mentioned, herein the threads used for the seams (functional or non-functional) can be clear multi-strand or monofilament or can be pigmented depending on the desired effect. Moreover, multiple colors are possible as are lighting from both ends of the cable 10 (same color or different). Still further, the colors can be dynamically changed through lensing arrangements, redundant (different) light sources, and by the use of different lenses (fixed or moving).

FIGS. 11 and 12 illustrate the possibility of illuminating a double and single needle non-functional stitch 33 using a light conducting and/or generating medium 10 which is attached directly behind the stitch seam on the backside of the part by for example, a retainer tape 26. Tape or retainer tape 26 being sufficient to secure the light conducting and/or generating medium 10 in the appropriate location. Also shown is a non-functional stitch 33. Accordingly, the seams do not have to be functional to be used with side emitting fiber optic cable 10. FIG. 11 illustrates a simulated French seam 33 with dual fiber optic cables 10 and FIG. 12 illustrates a simple stitch 33' with a fiber optic cable 10.

Still further and in an alternative embodiment (See at least FIG. 13), actual stitching is not required. In this embodiment or in combination with any of the previous embodiments the material 15 is provided with perforations 35 extending therethrough and the light conducting and/or generating medium 10 is located to illuminate the perforations 35. FIG. 13 illustrates the use of light conducting and/or generating medium 10 to illuminate a perforation or numerous perforations 35 introduced to the material 15 and in this embodiment no stitch or join seam is present. Of course, perforations 35 may be used in combination with any of the aforementioned seams and stitches. Still further and as mentioned, the threads used for the seams (functional or non-functional) can be clear multi-strand or monofilament or can be pigmented depending on the desired effect.

As mentioned above and where applicable, the light conducting medium 10 can be stitched into the seam, or inserted into a previously stitched seam or comprise the materials (e.g., thread) that is used to form the seam or any combination thereof to provide an interior portion 12 of a vehicle or any other component manufactured wherein an illuminated stitch or portion is desired. Variations in the thickness of the light conducting medium especially when used in a non-stitching application can vary the desired effect of the same.

Figure 14:
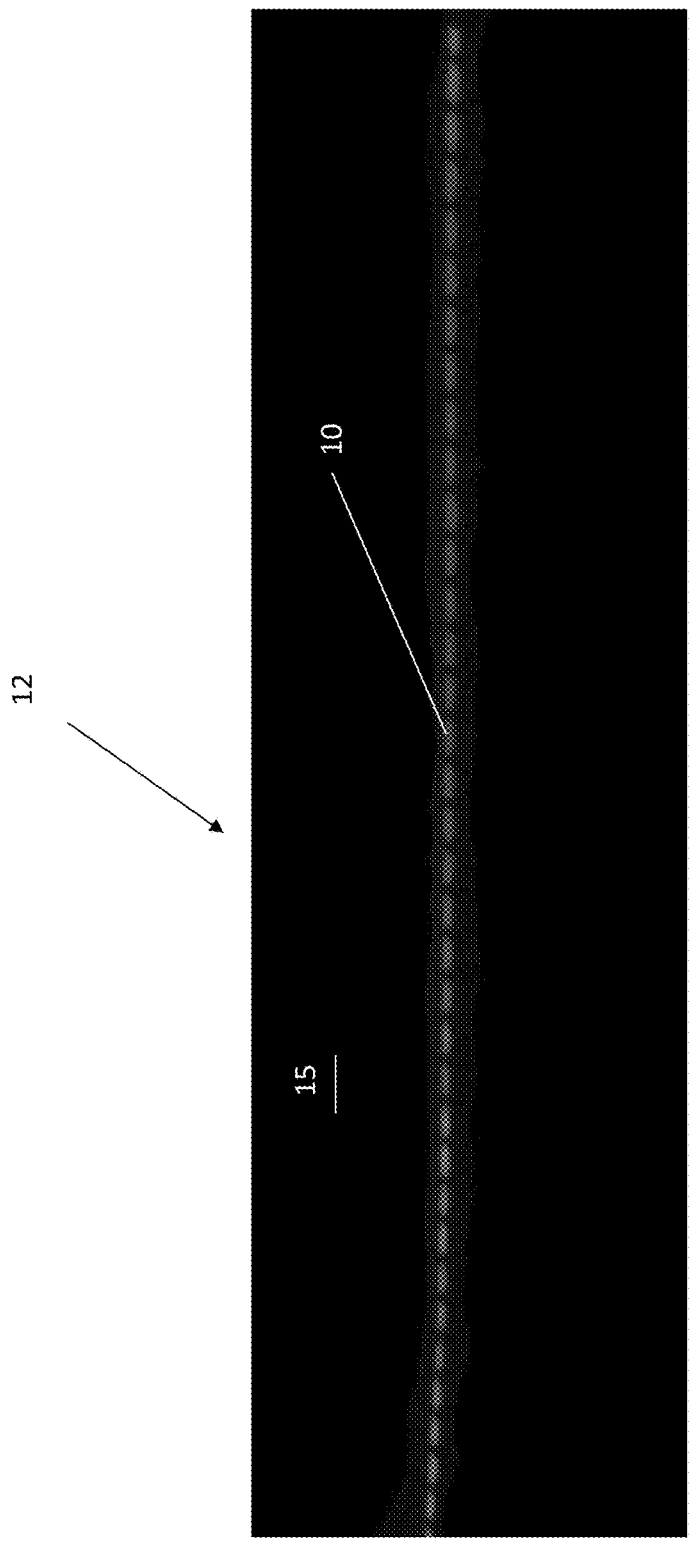
FIG. 14 is a top view or surface view of a portion of a component formed in accordance with an exemplary embodiment of the present invention.

FIG. 14 is a view of a show surface of an interior portion of a component formed in accordance with an exemplary embodiment of the present invention, wherein a deck seam similar to the embodiment illustrated in FIG. 1 is employed with a 3 mm side emitting light pipe inserted into the join seam.

Referring now to FIGS. 15A and 15B a cross-sectional view of an illuminated component 12 in accordance with one alternative exemplary embodiment is illustrated. Here the light conducting medium 10 is positioned adjacent or below the cover material 15 such that the light conducting medium 10 is located on an opposite side of the show surface 22 of the illuminated component 12 and is arranged to coincide with the threads of the seam to be illuminated. In this embodiment, translucent threads 30 are utilized and the light conducting medium 10 (e.g., light conductor or light generator) is located adjacent to the translucent threads such that light can be passed through them to the show surface or front 22 by applying a light source to the back 32 of the illuminated component 12. In one non-limiting embodiment, the light conducting or generating medium 10 is a light conducting medium coupled to a light generator 34 such as an LED or any other equivalent structure. Alternatively, the entire cable 36 is a light generator or light producing device.

FIG. 15B illustrates the illumination of the light conducting or light generating medium 10 wherein the color of the conductor/generator is passed through the translucent threads 30 indicated by arrows 38.

Figure 16A:
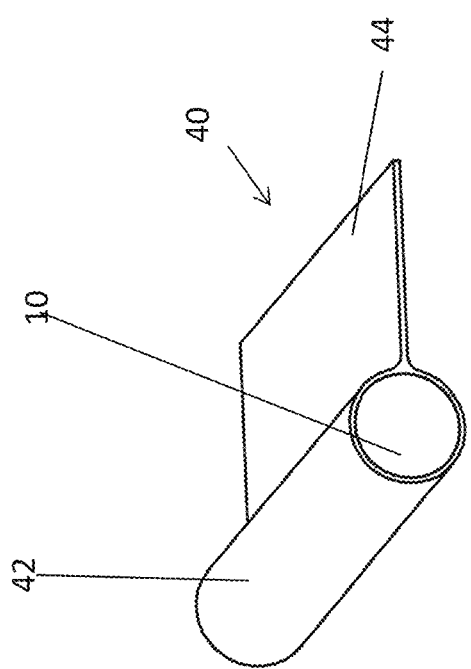
FIGS. 16A and 16B are views illustrating a source of illumination coextruded with a material.
Figure 16B:
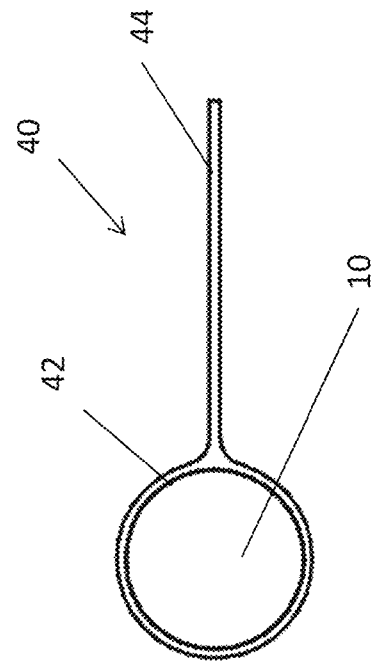

Referring now to FIGS. 16A and 16B welting with a side emitting fiber optic cable 10 or any other suitable elongated light conducting device 10 is shown as being co-extruded with a sewable material 40 that provides a coextruded jacket 42 located around the light conducting device 10 and also provides a portion 44 capable of being sewn into a component 12. In one non-limiting embodiment, the co-extruded jacket 42 can be clear, or translucent.

Accordingly and in this embodiment, the side emitting fiber optic cable 10 can be co-extruded with a sew-able material creating piping, or welting. When this coextruded item is sewn into a seam and illuminated, it can create dramatic effects on many different products.

Referring now to FIGS. 17A and 17B welting with a side emitting fiber optic cable 10 or any other suitable elongated light conducting device 10 is shown as being wrapped with a sewable material 40 that provides a jacket 42 located around the light conducting device 10 and also provides a portion 44 capable of being sewn into a component 12. In this embodiment, the jacket 42 is also provided with a perforated covering 46 that can provide interesting light effects when illuminated. Covering 46 also includes a sewable portion 45 located proximate to portion 44. As with the previous embodiments, this design can be sewn into numerous seams the way any piping or welting material could be. Also, the perforations 48 can be numerous shapes for added impact or effect. In addition, perforated covering 46 may also be translucent and/or opaque to provide still other lighting effects when illuminated by the light conducting or generating medium 10.

Accordingly and in this embodiment, the side emitting fiber optic cable 10 can be wrapped with a sew-able material creating piping, or welting. When this item is sewn into a seam and illuminated, it can create dramatic effects on many different products.

Referring now to FIGS. 18A-18C another alternative embodiment is illustrated. Here the light conducting or generating medium 10 (e.g., side emitting fiber optic cable or any other equivalent device) is coextruded with a material 50 that can be positioned within a seam 52 located between two materials 15 that are sewn together at seam 52. In this embodiment, the shape of the coextruded material (e.g., light conducting or generating medium 10 and material 50) can be designed to affect the shape of the sewn seam 52. Still further numerous fiber optic shapes of the light conducting or generating medium 10 can be used to provide different lighting effects as well as facilitating co-extrusion. Non-limiting configurations of such shapes are illustrated in FIGS. 18A-18C.

In addition, material 50 can comprise a softer material in order to facilitate sewing of seam 52 by passing threads 54 therethrough.

Figure 19:
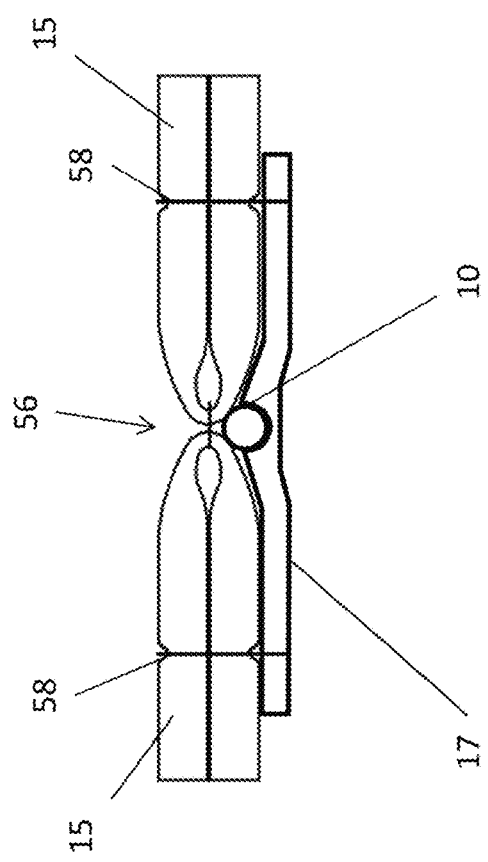
FIG. 19 is another alternative configuration of the source of illumination coextruded with a material.

Referring now to FIG. 19 yet another alternative embodiment is illustrated. Here the light conducting/generating medium 10 (e.g., side emitting fiber optic cable or any other equivalent device) is coextruded or assembled with a supporting structure 17. In this embodiment the supporting structure with the coextruded or integrally placed light conducting/generating medium 10 helps facilitate securement of the same to materials 15 during the forming of a seam 56, which in the illustrated embodiment is a French seam formed with stitches 58.

Figure 20:
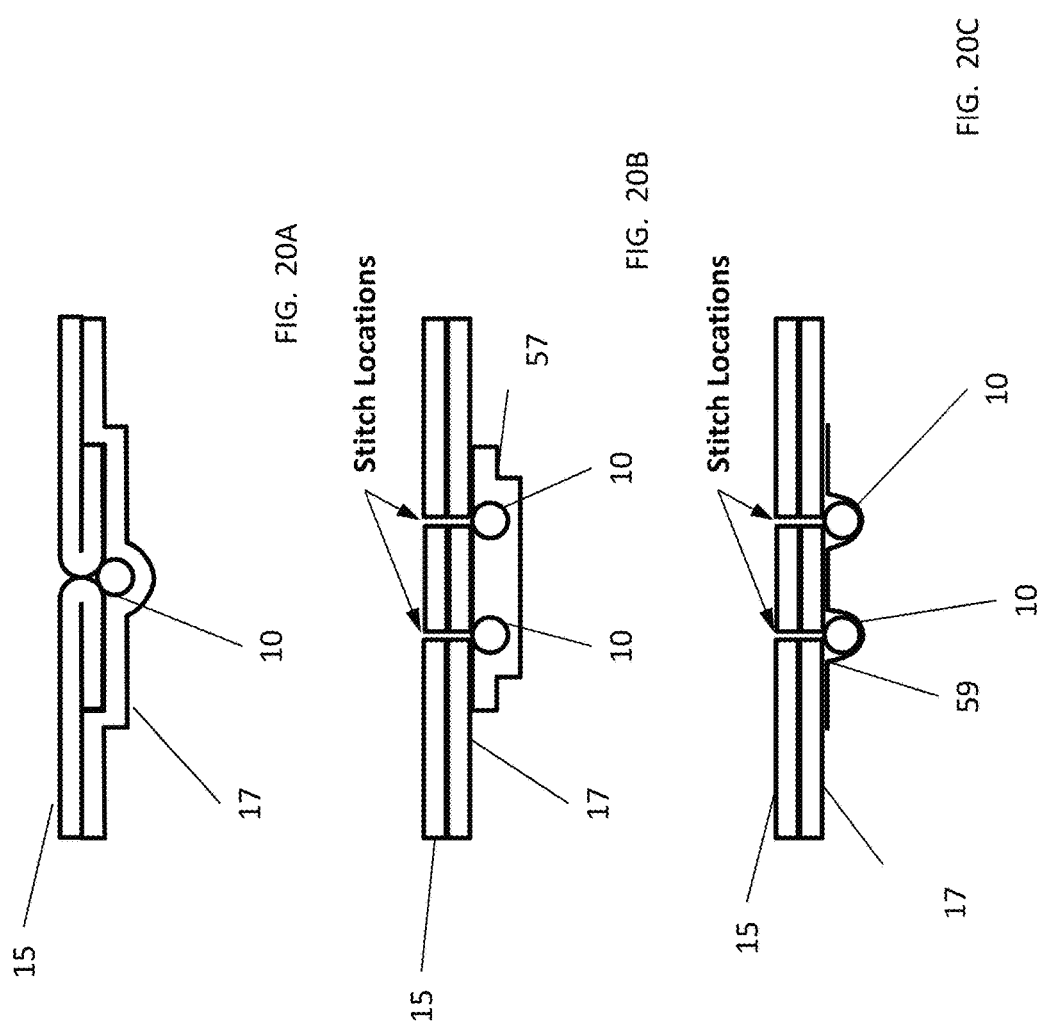
FIGS. 20A-20C are views illustrating alternative configurations of the source of illumination secured to a material.

As illustrated in FIGS. 20A-20C and in yet another embodiment, the light conducting or light generating medium 10 can also be applied to or integrated with the substrate material 17 being wrapped by a cover material 15.

For example and as illustrated in FIG. 20A, the light conducting or light generating medium 10 is located on a substrate 17 wherein numerous attachment methods are employed ranging from directly assembled to molded in place. Moreover and in one embodiment wherein the stitch is decorative only, the stitching is applied through the cover material 15 and the substrate 17. Accordingly and when translucent threads are used, light can be passed through them to the front by applying a light source to the back of the part.

As mentioned above, the light source 10 can be fixed to layers 15 with a separately molded (or extruded piece) 17, or with another component 57 (extruded or assembled, FIG. 20B) or with simple tape 59 (FIG. 20C).

Figure 21:
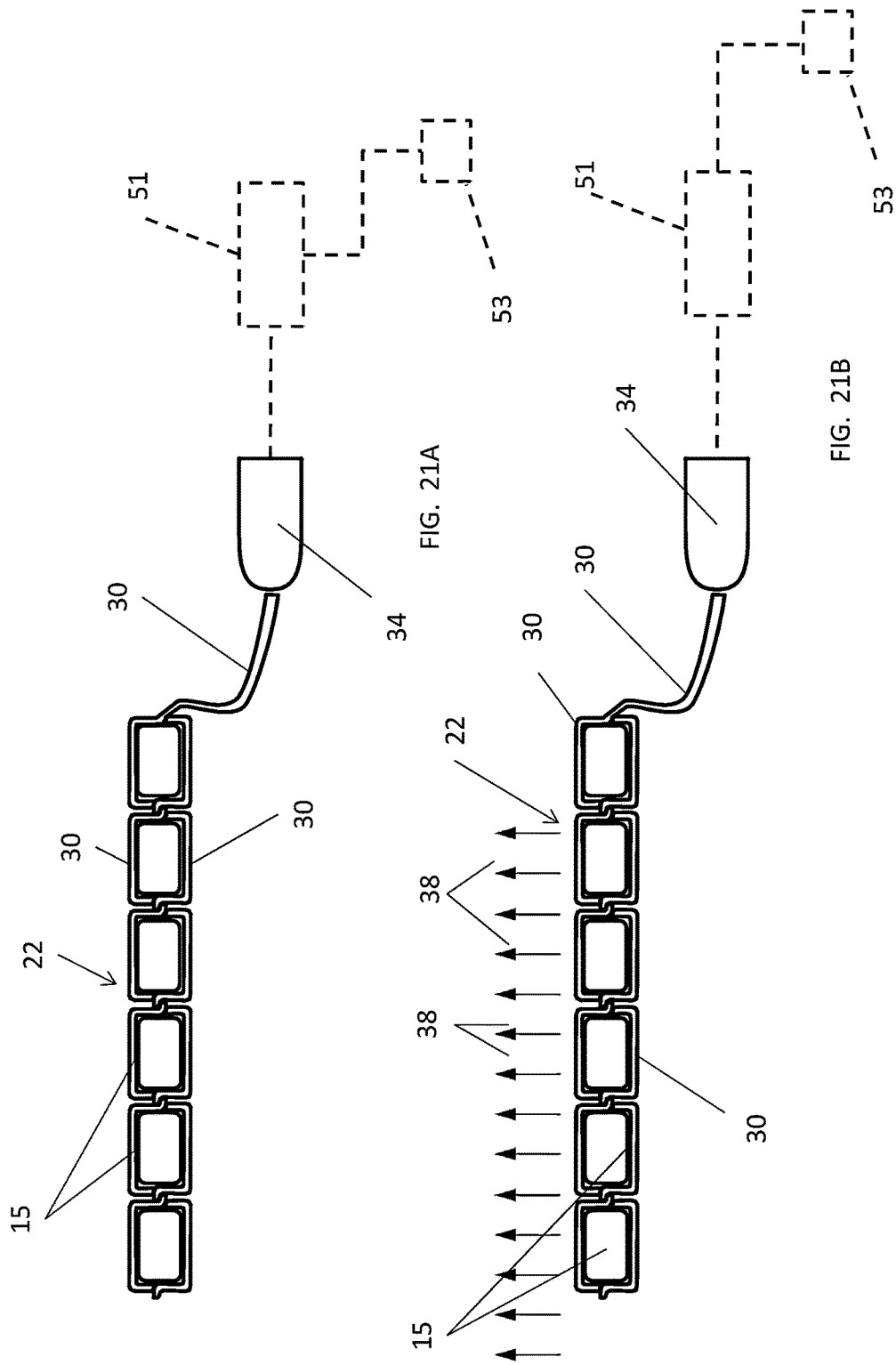
FIGS. 21A and 21B are cross-sectional views of an article illuminated an illuminated thread.

Referring now to FIGS. 21A and 21B a cross-sectional view of an illuminated component 12 in accordance with yet another alternative exemplary embodiment is illustrated. Here the light generator 34 is directly coupled to the translucent threads 30 such that light can be passed through them to the show surface or front 22. Accordingly and as mentioned above and in this embodiment, the threads themselves are the light conducting medium. This may be particularly useful in short runs or lengths of stitching wherein the light can be directly transmitted to the sewn stitch without a separate light conductor 10. In one non-limiting embodiment, the light generator 34 is an LED or any other equivalent structure. One non-limiting example of translucent threads 30 is a mono-filament material. FIG. 15B illustrates the illumination of the translucent threads 30 indicated by arrows 38. Still further, this embodiment may be combined with embodiments employing the light conducting medium 10 thus numerous combinations are possible.

Figure 22:
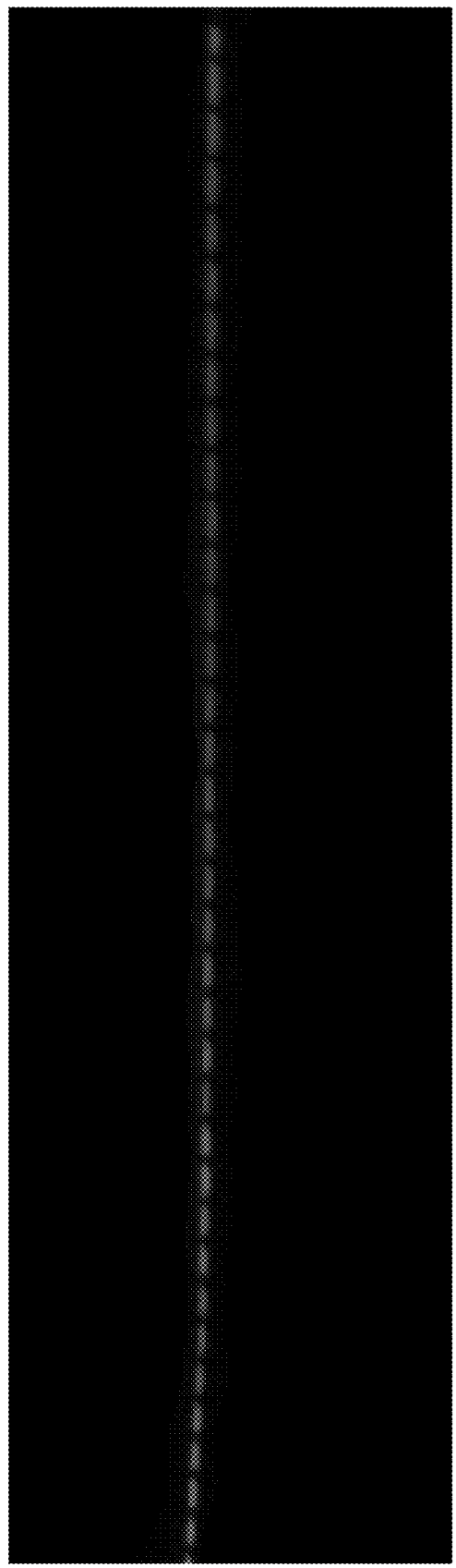
FIG. 22 is a view or surface view of a component illuminated in accordance with various exemplary embodiments of the present invention.

FIG. 22 illustrates a deck seam illuminated with a 3 mm side emitting light pipe.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method of illuminating a component, comprising an outer surface layer, the method comprising:
   forming a deck seam between at least two separate pieces of an outer skin layer, the deck seam having two join seams each joining two distinct portions of the at least two pieces together; and
   locating an elongated light conducting medium in the deck seam between the two join seams, wherein tension control on one of the two join seams above the elongated light conducting medium provides a design gap located above the light conducting medium and between the at least two pieces so that the at least two pieces do not contact each other at the design gap and wherein light generated by the light conducting medium shows through the design gap, the design gap having a width between the at least two separate pieces at the one of the two join seams, and wherein the width of the design gap between the at least two separate pieces is smaller than a diameter of the elongated light conducting medium.

2. The method as in claim 1, wherein the outer skin layer, is formed from the group consisting of vinyl, leather, cloth and thermoplastic polyolefin (TPO) and other man made or natural materials.

3. A component formed by the method of claim 2, wherein the component is an interior trim piece of a vehicle.

4. The component of claim 3, wherein the interior trim piece is a portion of an instrument panel of the vehicle.

5. The method as in claim 1, wherein the elongated light conducting medium is a side emitting fiber optic cable.

6. The method as in claim 1, wherein the elongated light conducting medium is a side emitting fiber optic cable and a portion of at least one of the at least two separate pieces of the outer skin layer is folded back upon the at least one of the at least two separate pieces of the outer skin layer prior to the application of one of the two join seams, wherein at least one of the two join seams passes through a folded portion of the at least one of the at least two separate pieces of the outer skin layer.

7. The method as in claim 1, wherein the elongated light is a side emitting fiber optic cable and wherein the outer skin layer, is formed from the group consisting of vinyl, leather, cloth and thermoplastic polyolefin (TPO).

8. A component formed by the method of claim 7, wherein the component is an interior trim piece of a vehicle.

9. The component of claim 8, wherein the interior trim piece is a portion of an instrument panel of the vehicle.

10. The method as in claim 1, wherein the elongated light conducting medium is inserted into the seam after the seam is formed.

11. The method as in claim 10, wherein the elongated light conducting medium is coextruded with a supporting structure and wherein the outer skin layer, is formed from the group consisting of vinyl, leather, cloth and thermoplastic polyolefin (TPO).

12. A component formed by the method of claim 11, wherein the component is an interior trim piece of a vehicle.

13. The component of claim 12, wherein the interior trim piece is a portion of an instrument panel of the vehicle.

14. A component formed by the method of claim 11, wherein the elongated light conducting medium is electrically coupled to a vehicle function such that a light intensity and color of the elongated light conducting medium can be varied.

15. The component of claim 14 wherein the vehicle function is selected from the group comprising: turn signal indicators, music volume, vehicle speed, engine RPM and/or acceleration and combinations thereof.

16. The method as in claim 1, wherein the elongated light conducting medium is sewn into the seam at the same time the seam is formed.

17. The method as in claim 16, wherein the elongated light conducting medium is a side emitting fiber optic cable and wherein the outer skin layer, is formed from the group consisting of vinyl, leather, cloth and thermoplastic polyolefin (TPO).

18. A component formed by the method of claim 17, wherein the component is an interior trim piece of a vehicle.

19. The component of claim 18, wherein the interior trim piece is a portion of an instrument panel of the vehicle.

20. The component of claim 19, wherein the elongated light conducting medium is electrically coupled to a vehicle function such that a light intensity and color of the elongated light conducting medium can be varied and wherein the vehicle function is selected from the group comprising: turn signal indicators, music volume, vehicle speed, engine RPM and/or acceleration and combinations thereof.

* * * * *